No. 845,804. PATENTED MAR. 5, 1907.
M. A. MARTIN.
RESERVOIR.
APPLICATION FILED JULY 11, 1904.
2 SHEETS—SHEET 1.
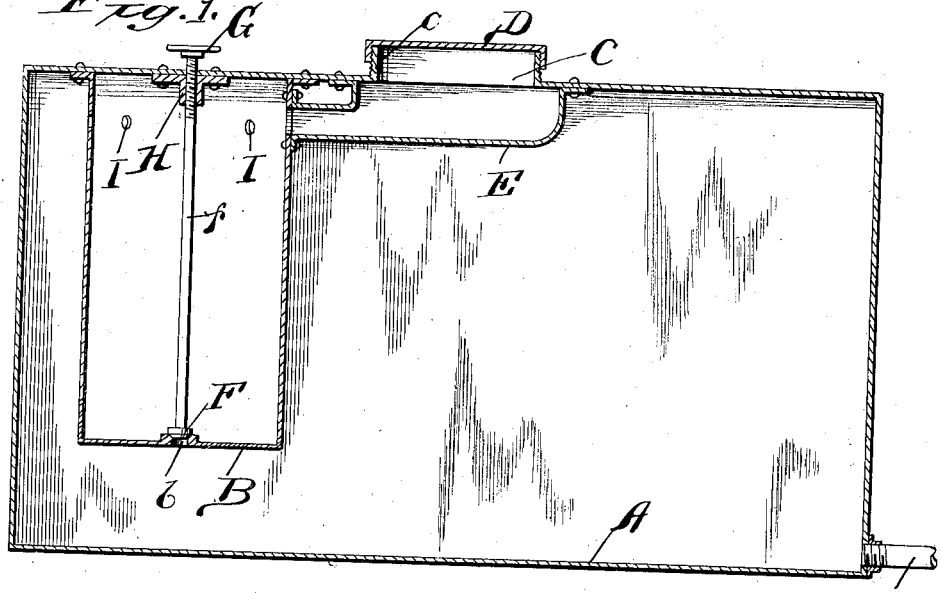
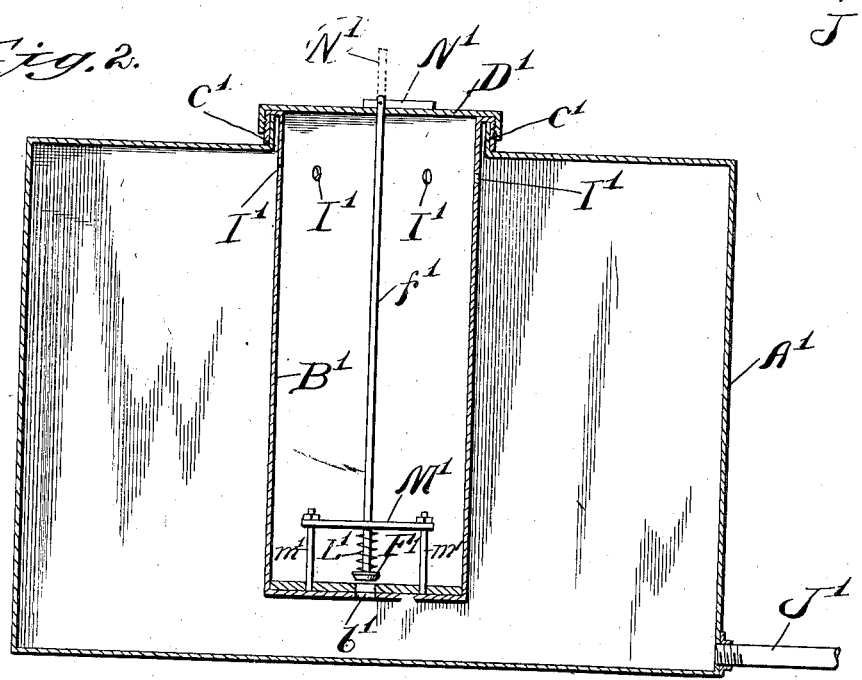
Witnesses:
J. B. Weir
Oliver R. Plummer
Inventor:
Myron A. Martin
by Bond, Adams, Pickard & Jackson
his Attys.

No. 845,804. PATENTED MAR. 5, 1907.
M. A. MARTIN.
RESERVOIR.
APPLICATION FILED JULY 11, 1904.
2 SHEETS—SHEET 2.
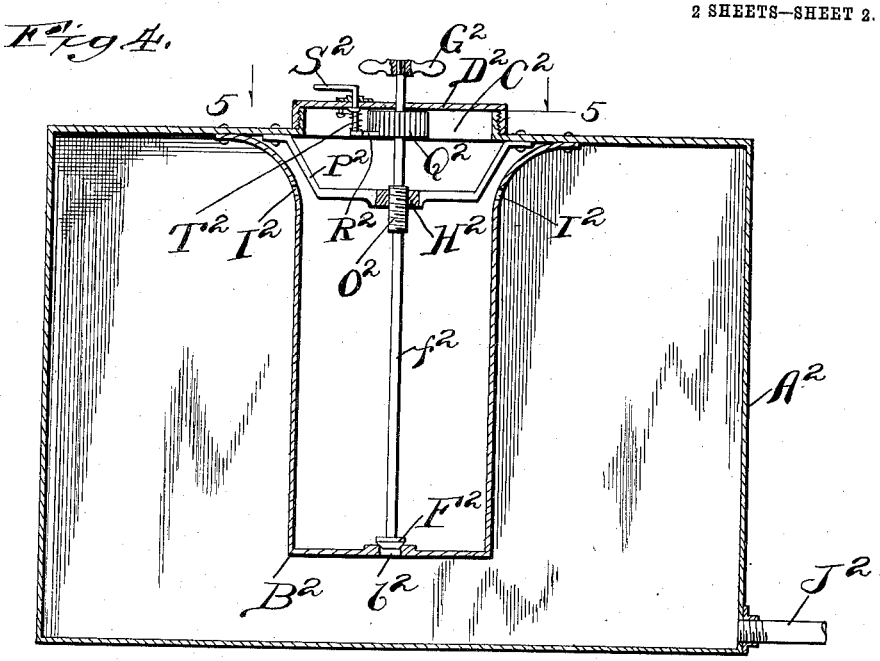
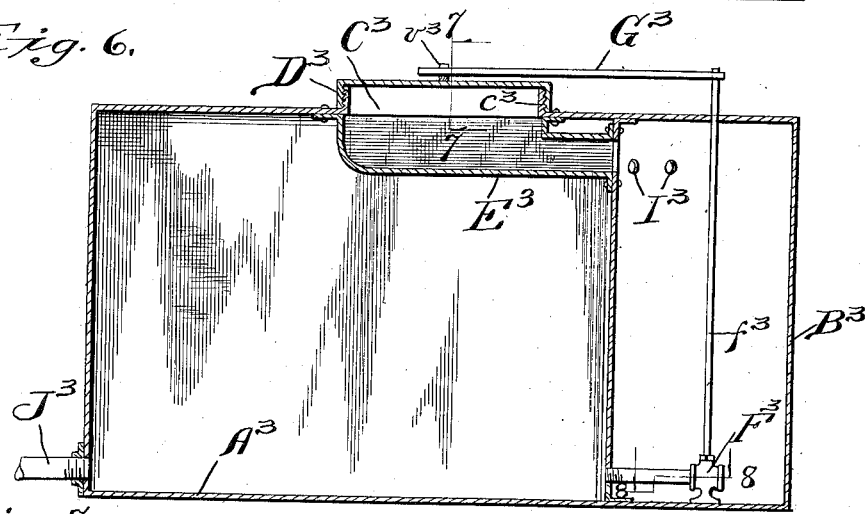
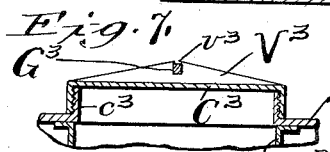
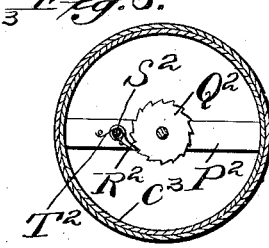
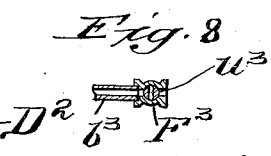
Witnesses:
J. B. Weir
Inventor:
Myron A. Martin
by Bond, Adams, Pickard & Jackson
his Attys.

UNITED STATES PATENT OFFICE.

MYRON A. MARTIN, OF CHICAGO, ILLINOIS.

RESERVOIR.

No. 845,804.     Specification of Letters Patent.     Patented March 5, 1907.

Application filed July 11, 1904. Serial No. 216,090.

*To all whom it may concern:*

Be it known that I, MYRON A. MARTIN, a citizen of the United States, residing at Chicago, in the county of Cook and State of Illinois, have invented certain new and useful Improvements in Reservoirs, of which the following is a specification, reference being had to the accompanying drawings.

My invention relates to reservoirs for liquids, and while it is designed particularly for use in storing gasolene or other hydrocarbon liquids for supplying gasolene-engines of automobiles, &c., it may be applied to any other purpose for which it is adapted.

It has for its object to provide a reservoir of such construction that the entire contents thereof cannot be consumed without the operator first receiving warning that his supply of gasolene is getting low, a reserve supply being available for use after the operator receives notice that the main supply is exhausted.

To this end my invention consists in a reservoir comprising a plurality of tanks—one of which must be filled through the other—in connection with means for insuring the isolation of the contents of one of said tanks, so that the consumption of the liquid in the other does not affect the supply in the isolated or reserve tank. Thus when the main supply is consumed the reserve supply will still remain available and can be used to operate the engine until a further supply can be secured.

A further improvement consists in providing means by which the closure of the outlet through which liquid is drawn from the reserve tank is made a necessary antecedent to the filling of the main tank, thereby insuring the filling of the reserve tank before the main tank can be filled.

Still further improvements consist in placing the reserve tank within the main tank and providing for filling the main tank by overflow from the reserve tank, in providing means operatively connecting the valve which controls the discharge of the contents of the reserve tank with the cap or other closure for the inlet-opening, so that the cap cannot be removed until the outlet from the reserve tank is closed, and in certain details of construction which will be hereinafter set forth.

In the accompanying drawings, Figure 1 is a sectional view illustrating a simple embodiment of my primary invention. Fig. 2 is a similar view showing a form of apparatus embodying all the principal features of my invention. Fig. 3 is a detail of certain parts shown in Fig. 2. Fig. 4 is a sectional view illustrating a modification. Fig. 5 is a section on line 5 5 of Fig. 4. Fig. 6 is a sectional view illustrating a further modification. Fig. 7 is a section on line 7 7 of Fig. 6, and Fig. 8 is a sectional detail on line 8 8 of Fig. 6.

Referring first to Fig. 1, A indicates the main tank, and B the reserve tank, which, as therein illustrated, is placed within the main tank, being suspended from the upper portion thereof. C indicates an inlet-opening, which is preferably provided with a rim $c$, having a cap D. E indicates a duct which extends from the opening C to the upper portion of the reserve tank B, so that liquid supplied through the opening C necessarily flows into the reserve tank B. $b$ indicates an opening in the lower portion of the reserve tank B, preferably in the bottom thereof, through which the contents of the tank B may discharge into the main tank A. F indicates a valve seated in the opening $b$ and vertically adjustable by a valve-stem $f$, having at its upper end a hand-wheel G, by which the stem may be rotated. As shown, the upper portion of the stem is screw-threaded and is fitted in a threaded bearing H, so that by rotating the valve-stem the valve F may be moved toward or from its seat. I indicates overflow-openings in the upper portion of the reserve tank B, through which liquid in said tank may flow into the tank A. J indicates an outlet-pipe, through which the contents of the tank A may be discharged for use, as to the carbureter of a gasolene-engine.

In the form of apparatus illustrated in Fig. 1 the valve F is first seated by operating the hand-wheel G, and the reserve tank is then filled until it overflows through the openings I into the main tank A, which is filled by the overflow. The consumption of the supply in the main tank A does not affect the contents of the reserve tank B so long as the valve F is kept closed. When the supply in the tank A is exhausted, the operator becomes aware of the fact through the failure of the supply of gasolene and accordingly opens the valve F, thereby admitting the reserve supply to the main tank. He then knows just how much gasolene he still has, and can govern himself accordingly.

It will be observed that in the form of apparatus shown in Fig. 1 while provision is made for filling the main tank through the reserve tank after the reserve tank is first filled the construction is such that the prior filling of the reserve tank is not insured, since should the operator fail to close the valve F the main tank would be filled coincidentally with the filling of the reserve tank and no reserve supply would be retained in the reserve tank after that in the main tank had been consumed. To avoid any such oversight, I have provided an improvement upon the primary invention illustrated in Fig. 1, such improvement consisting in means by which the closing of the outlet-valve of the reserve tank is insured before the reservoir can be filled. The forms of apparatus shown in the remaining figures all embody this feature.

In the construction shown in Fig. 2, $A'$ indicates the main tank, and $B'$ the reserve tank. The main tank $A'$ is provided at the top with an opening $C'$, which is surrounded by a rim $c'$, and the reserve tank $B'$ is suspended from the rim $c'$ by having its upper edge $K'$ upset outwardly, so that it is adapted to hook over the rim $c'$, as shown. The cap $D'$ is adapted to screw upon the upper portion of the reserve tank $B'$, as shown, thereby closing the opening $C'$, as well as the upper end of the reserve tank. $b'$ indicates the opening through which the contents of the reserve tank may pass to the main tank. Said opening is provided with a valve $F'$, which is normally held on its seat by a spring $L'$. Said spring is mounted on the stem $f'$ of the valve $F'$, and its upper end bears against a cross-bar $M'$, held in place by vertical bars $m'$. The lower end of the spring $L'$ bears on the top of the valve $F'$. $N'$ indicates a lever, pivoted between its ends to the upper end of the valve-stem $f'$ in such manner that it may be turned into alinement with said valve-stem or at an angle thereto, as shown in Fig. 2. The stem $f'$ passes through an opening in the cap $D'$, and the lever $N'$ is so placed that when turned to its horizontal position (shown in Fig. 2) it will rest on top of the cap $D'$ and will then hold the valve $F'$ off its seat. When the lever $N'$ is in alinement with the stem $f'$, the valve is permitted to seat itself under the action of the spring $L'$. $I'$ indicates overflow-openings in the upper portion of the reserve tank. $J'$ indicates the outlet-pipe leading from the main tank $A'$. By this construction when the reservoir is to be filled the cap $D'$ must first be removed; but it cannot be removed as long as the lever $N'$ is in its horizontal position. Normally the lever $N'$ is in the position shown in dotted lines in Fig. 2, and the valve $F'$ is on its seat; but when it is desired to use the contents of the reserve tank the valve $F'$ must be withdrawn from its seat, and to do this the stem $f'$ is drawn up and the lever $N'$ turned into the position shown in full lines in Fig. 2, thereby preventing the removal of the cap $D'$. It follows that in order to remove the cap $D'$ the lever $N'$ must be again moved into alinement with the stem $f'$, and in so doing the valve $F'$ is permitted to seat itself, thereby closing the outlet $b'$. The outlet $b'$ therefore is always closed when the cap is off, as is the case when the reservoir is to be filled. The main tank is filled by overflow from the reserve tank, as in the construction illustrated in Fig. 1.

In the construction shown in Fig. 4, $A^2$ indicates the main tank, and $B^2$ the reserve tank. In this construction also the reserve tank is secured to the roof of the main tank and is provided with an outlet $b^2$ at its lower end. The outlet $b^2$ is closed by a valve $F^2$, provided with a stem $f^2$, which extends up through an opening $C^2$ in the roof of the main tank $A^2$ and is provided with a handle $G^2$, by which it may be rotated. The stem $f^2$ is provided near its upper end with a left-hand screw-threaded portion $O^2$, which fits in a suitable threaded bearing $H^2$, provided in a bracket $P^2$, suitably secured to the top of the main tank $A^2$, as shown. Obviously by rotating the stem $f^2$ in the proper direction the valve $F^2$ may be moved down upon its seat. Above the screw-threaded portion $O^2$ the stem $f^2$ is provided with a ratchet-wheel $Q^2$, which is adapted to be engaged by a pawl $R^2$, carried by a vertically-disposed shaft $S^2$, which is mounted in the cap $D^2$, which closes the opening $C^2$, being screwed upon the rim $c^2$, the latter being provided with right-hand screw-threads. A spring $T^2$ serves to hold the pawl $R^2$ normally in engagement with the ratchet-wheel $Q^2$. $I^2$ indicates overflow-openings in the reserve tank. $J^2$ indicates the outlet-pipe from the main tank.

The operation is as follows: Assuming the supply in the main tank to have been exhausted, the valve $F^2$ is opened by rotating the stem $f^2$ in a right-hand direction. In order to permit this, the pawl $R^2$ must be moved out of engagement with the ratchet-wheel $Q^2$ by rocking the shaft $S^2$ by hand against the action of the spring $T^2$. When it is desired to fill the reservoir, the cap $D^2$ is unscrewed in the ordinary way, thereby rotating the stem $f^2$ in the same direction through pawl $R^2$ and ratchet-wheel $Q^2$. The result is that the stem $f^2$ is screwed down, moving the valve $F^2$ to its seat and closing the outlet $b^2$. After the valve is seated the pawl $R^2$ may be moved out of engagement with the ratchet-wheel by rocking the shaft $S^2$, as before. The handle $G^2$ is removable from the stem $f^2$ to permit the removal of the cap $D^2$. The reserve tank $B^2$ is then filled directly, the main tank being filled by the overflow, as before described. When the cap is replaced, the valve is not affected, since the pawl $R^2$ is inoperative when the cap is turned to the right.

In the construction shown in Fig. 6, A³ indicates the main tank, and B³ the reserve tank, which in this form is shown at one end of the main tank. C³ indicates the filling-opening in the top of the tank A³, and c³ the rim which receives the cap D³. E³ indicates a duct, similar to that shown in Fig. 1, for directing the gasolene into the reserve tank B³. I³ indicates overflow-openings, and J³ the outlet from the main tank. b³ indicates an outlet-pipe extending from a valve F³, through the wall of the reserve tank B³, so as to discharge into the main tank A³. The valve F³ is provided with a plug U³, which may be rotated to open or close communication between the reserve tank B³ and the main tank A³. f³ indicates the stem of the plug U³, which extends up through the top of the reserve tank B³ and is provided with a lever G³, which extends over the cap D³ and is adapted to fit into a notch v³ in a retaining-block V³. The notch v³ is at the apex of the retaining device, the sides of which are inclined toward the edges of the cap, as shown in Fig. 7. The arrangement is such that when the lever G³ is in the notch v³ the valve F³ is open and at the same time the cap D³ is locked in position. To remove the cap, the lever G³ must be swung to the right or left sufficiently to close the valve F³, thereby cutting off communication between the reserve tank B³ and the main tank A³. This construction also, therefore, insures the filling of the reserve tank before the main tank can be filled.

In addition to the forms of apparatus described various other arrangements may be made by which the same results can be secured. I wish to be understood, therefore, that my invention, generically considered, is not restricted to the specific forms of apparatus described.

That which I claim as my invention, and desire to secure by Letters Patent, is—

1. A fuel-tank divided into two chambers by a partition and communicating with each other at different levels, a filling-inlet closure for said tank, a fuel-outlet from the one compartment permitting a normal flow of fluid therefrom, means to control the lower communication and means coacting with said controlling means and with the inlet-closure whereby the closure cannot be removed to refill until the flow between the two compartments is cut off.

2. Means for storing a primary and a secondary supply of fuel, an outlet connection from said storing means normally permitting the primary supply of fuel to flow freely, means whereby the secondary supply of fuel can be fed through the outlet, an intake-opening through which additional fuel is supplied provided with a closure and locking means for securing the closure and the parts in position to feed from the secondary supply of fuel, and means for restoring the parts to their normal position when the locking means for securing the parts in position to feed from the secondary supply of fuel is unlocked and disengaged from the inlet-closure.

3. Means for storing a primary and a secondary supply of fuel, an outlet connection with the said storing means normally permitting the primary supply of fuel to flow freely, an intake-opening through which additional fuel is supplied provided with a closure, means whereby the secondary supply of fuel can be fed through the outlet and locking mechanism for securing the parts in position to feed from the secondary supply of fuel, said locking means engaging with the inlet-closure when the parts are locked in position to feed the secondary supply of fuel.

4. Means for storing and feeding liquid fuel, comprising means for storing a primary and a reserve supply of fuel, means which normally permit the primary supply of fuel to flow freely, means under manual control whereby the reserve supply of fuel can be fed through the normal supply means and locking means therefor, an intake-opening through which additional fuel is supplied provided with a stopper so located as to be engaged by the locking means when the manual means is locked to feed the reserve supply and to be out of engagement therewith when the manual means is in its normal position.

MYRON A. MARTIN.

Witnesses:
JOHN L. JACKSON,
HELEN M. COLLIN.